United States Patent [19]

Miller

[11] Patent Number: 5,048,276
[45] Date of Patent: Sep. 17, 1991

[54] COMNBINED MOWER BLADE FLAIL ASSEMBLY

[76] Inventor: Gary D. Miller, 127 Solar Dr., Tipp City, Ohio 45371

[21] Appl. No.: 610,123

[22] Filed: Nov. 7, 1990

[51] Int. Cl.$^5$ ............................................. A01D 34/03
[52] U.S. Cl. ...................................... 56/16.9; 56/13.7
[58] Field of Search ...................... 56/11.6, 12.7, 13.6, 56/13.7, 16.9, 256, DIG. 4

[56] References Cited

U.S. PATENT DOCUMENTS

| | | | |
|---|---|---|---|
| 4,170,099 | 10/1979 | Owens | 56/16.9 |
| 4,453,372 | 6/1984 | Remer | 56/16.9 X |
| 4,642,976 | 2/1987 | Owens | 56/16.9 |

Primary Examiner—Thuy M. Bui
Attorney, Agent, or Firm—Joseph Patrick Burke

[57] ABSTRACT

The present disclosure is directed to a mower blade-weed cutting flail assembly wherein the mower blade and the flail cutting line (cord) always rotate in opposite directions with the cutting line always rotating faster than the mower blade so that the two never meet, viz., the mower blade cannot cut the line and the line cannot damage the blade. Attached to the upper interior portion of the mower deck adjacent one end portion thereof is the upper flange portion of the return spring and support whose bottom end supports the bottom portion of the main flail housing at a position near the flail main housing stub shaft extension arm. This secondary return spring and support supports the flail main housing (for the cord trimming unit), keeps the driven disc of the line cutter away from the mower disc drive unless and until the operating handle is engaged. When the operating handle to which a cable is attached is pushed, the cable pulls the line unit causing the driven disc to make contact with the mower blade drive disk located on the mower drive blade shaft, causing the driven disk to rotate, thereby operating the pulley which, through the pulley belt, in turn rotates the flail spool causing rapid rotation of the flail cutting line in the direction opposite to that of the mower cutting blade.

10 Claims, 3 Drawing Sheets

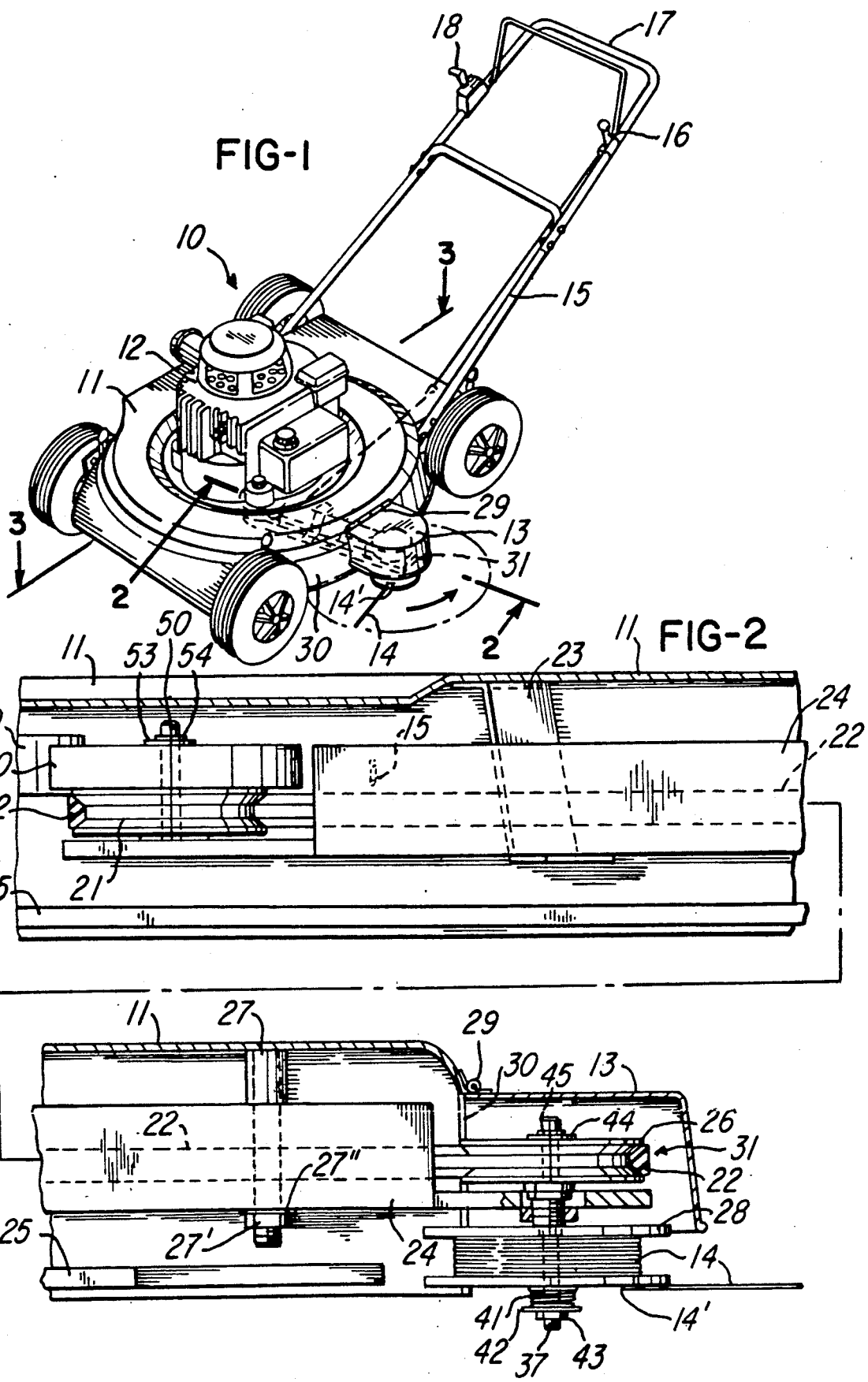

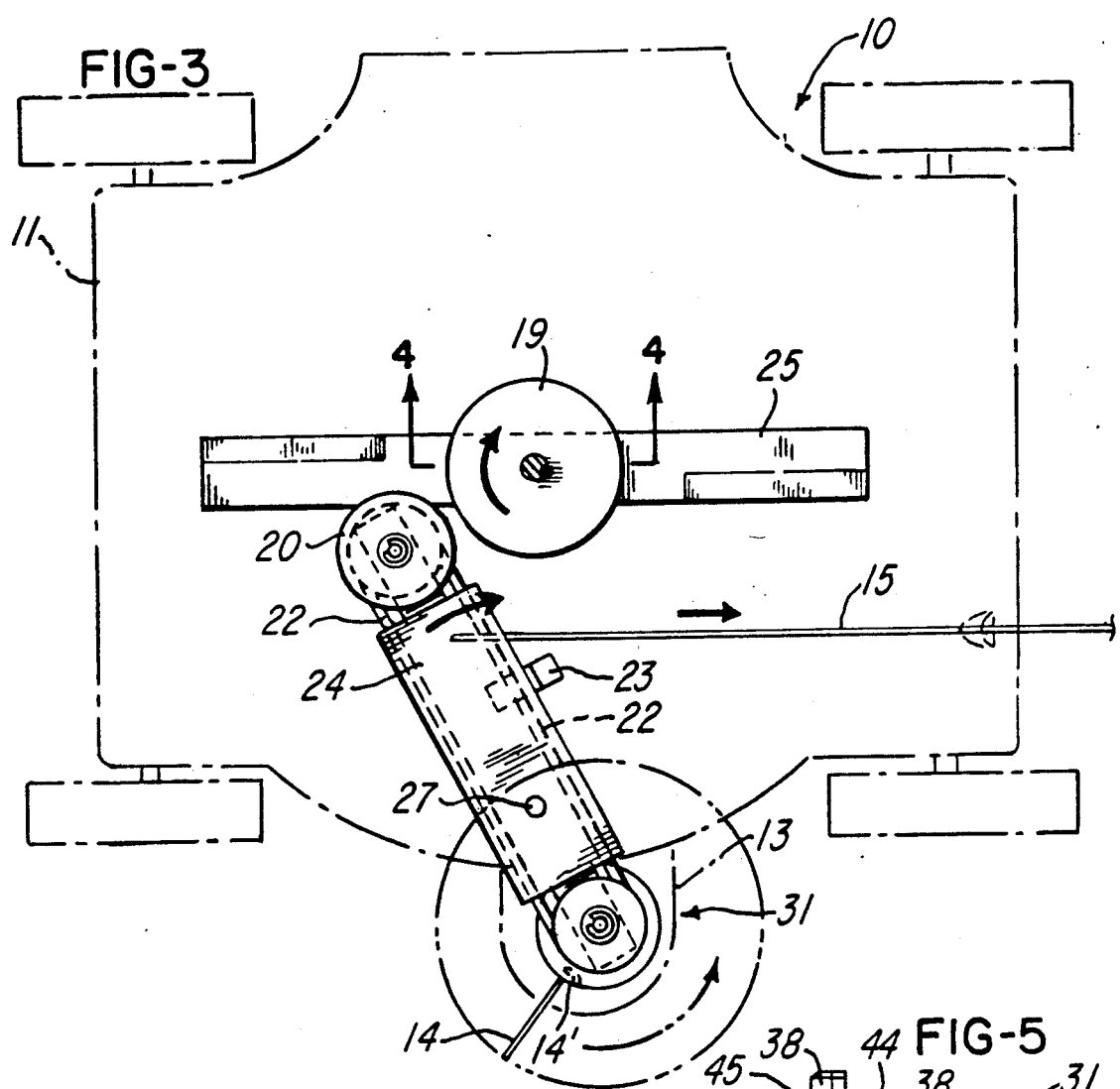

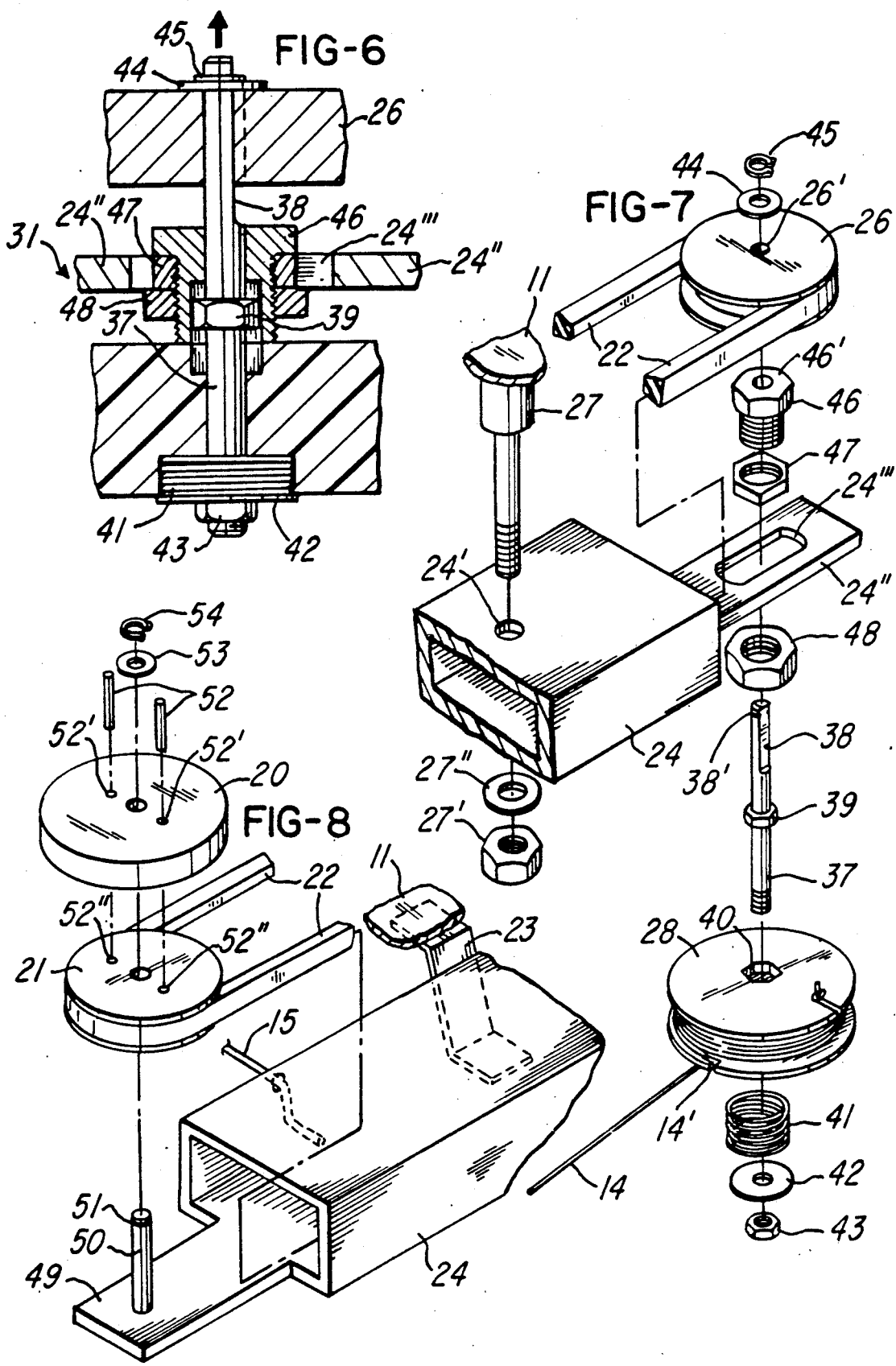

COMBINED MOWER BLADE FLAIL ASSEMBLY

BRIEF DESCRIPTION OF THE INVENTION

The present invention is directed to a mower blade-weed cutting flail assembly wherein the mower blade and the flail cutting line (cord) always rotate in opposite directions with the cutting line always rotating faster than the mower blade so that the two never meet, viz., the mower blade cannot cut the line and the line cannot damage the blade. Attached to the upper interior portion of the mower deck adjacent one end portion thereof is the upper flange portion of the return spring and support whose bottom end supports the bottom portion of the main flail housing at a position near the flail main housing stub shaft extension arm. This secondary return spring and support supports the flail main housing (for the cord trimming unit), keeps the driven disc of the line cutter away from the mower disc drive unless and until the operating handle is engaged. When the operating handle to which a cable is attached is pushed, the cable pulls the line unit causing the driven disc to make contact with the mower blade drive disk located on the mower drive blade shaft, causing the driven disk to rotate, thereby operating the pulley which, through the pulley belt, in turn rotates the flail spool causing rapid rotation of the flail cutting line in the direction opposite to that of the mower cutting blade.

BACKGROUND OF THE INVENTION AND PRIOR ART

When cutting grass, especially with a self propelled power lawn mower, the need frequently arises to trim weeds or grass located in areas where it is difficult to have the weeds or grass cut by the mower blade. This particularly occurs around plantings, flowers, hedges, etc. Therefore, an efficient combined mower/weed or edge trimmer has long been desired to accomplish these two somewhat different cutting tasks. Moreover, it is a further desired feature that a combined driven lawn mower/weed or edge cutter be obtained which permits both cutting of the grass and trimming of the weeds or grass immediately surrounding such planting, bush, or flowers to be done simultaneously. It is a further object of this invention to permit these two tasks to be conducted simultaneously without requiring specific adjustments to be made in the mower/trimmer unit which would cause loss of time in accomplishing these two tasks. It is a further objective of this invention to provide such a power driven lawn mower/weed or grass cutter utilizing a flail (line cutting) device to perform the weed/grass trimming/edging in the aforementioned manner.

There have been many attempts in the prior art to accomplish some of the foregoing tasks by utilizing a lawn mower combination with a trimmer of some type.

Maxwell K. Ould U.S. Pat. No. 4,715,169 is directed to an edging attachment for a motor driven lawn mower comprising a plate that is bolted to the mower housing, the plate supporting a drive shaft carrying an idler pulley and a drive pulley, a drive belt inter connecting a pulley on the motor of a mower to either the idler or drive pulley, means to selectively engage either the idler or drive pulley and an edging means operating in a plane substantially perpendicular to the cutting plane of the mower. The edging means is supported by the plate via a boom and is driven by the drive shaft via a flexible spindle drive. The boom allows adjustment of the cutting angle edging means. The position of the drive shaft and pulleys is also adjustable relative to the motor of the mower.

Boyd L. Owens U.S. Pat. No. 4,170,099 is directed to a grass edger and trimmer attachment for a power mower including a vertical trimmer shaft mounted in a bearing fixed to the side of the mower housing, the trimmer shaft being driven by a pulley which is belt driven by the mower engine, trimmer shaft supporting a trimmer hub carrying flail members at a level below the skirt of the mower housing, and the attachment further including an arm hinged to the housing carrying an edger shaft with a drive roller thereon and an edger hub at its outer end with flail members fixed to the periphery of the hub, the drive roller engaging the trimmer drive pulley and being driven thereby when the arm and the edger shaft are substantially horizontal, but the arm being tiltable about the hinge to an elevated position wherein the roller is disengaged and the edger hub and flail members are raised out of operative position.

Fred J. Remer U.S. Pat. No. 4,453,372 is directed to a universal grass edger and trimmer attachment utilizing a rotary flexible drive shaft whose operating end is supported by a multi-positional boom. This boom can be equipped with a vertically cutting edger 100 which cuts in the direction perpendicular to that of the lower blade or a horizontally cutting trimmer 102 which cuts in a direction parallel thereto.

Boyd L. Owens U.S. Pat. No. 4,642,976 is directed to a lawn mower trimmer and edger attachment having a cutting head and mounting assembly for adjustably supporting the cutting head on a mower. The mounting assembly for the head permits adjustment of the height of the head above the ground, its horizontal angle with respect to the frame of the mower and the inclination of the head from a horizontal to a vertical orientation or any angle of inclination there between. At the end of the head opposite its cutting flail members, there's a quick detach joint which allows, either an electric motor to be mounted and energized through a switch by electrical power available aboard the mower, or alternatively allows a cable drive to be mounted which drives the head from a friction drive mechanism taking power from the mower engine shaft, the friction drive being selectively engagable by means of a Bowden control cable. A guard to deflect cuttings away from the operation is mounted on the cutting head.

Tyson W. Howard U.S. Pat. No. 4,152,882 is directed to a cutting assembly usable in combination with a primary drive power source such as an internal combustion engine on a lawn mower, tractor, or like assembly or alternately an electrically powered hand tool or like element whereby a plurality of cutting elements define a cutting head or remotely extendable from the power source by means of a drive cable element, drivingly interconnected through a power take off to the drive power source. A gear adjustment assembly is disposed in power transmitting relation between the power drive source and the plurality of cutting elements so as to regulate the rotational speed of the cutting elements during operation. The power take off assembly is specifically configured to be adapted for either direct drive coupling relationship to a drive shaft of the power drive source; or alternately, to accomplish frictional driving engagement therewith such that rotation of the cable drive element and accordingly the plurality of cutting elements may be readily accomplished with minor modification of the lawn mower, electrical tool or other power drive source used in combination with the vegetation cutting assembly.

James M. Parker U.S. Pat. No. 3,668,845 is directed to an improved rotary lawn mower having a self-contained power take-off arranged in one corner of the forward edge of the mower deck. An auxiliary unit, having a blade driven by a pulley and a belt extending to the power take-off, is supported from the deck and is movable between a trimming position in which the blade is substantially horizontal and an edging position in which the blade is substantially vertical. A cam means automatically compensates for distance changes between the pulley and the power take-off as the unit is moved between the trimming and edging positions.

L. H. Hansen U.S. Pat. No. 3,531,922 is directed to a trimmer and edger attachment for a power mower containing a bracket and bearings for journaling vertical and horizontal blade supporting shafts with beveled gears interconnecting the shafts. The bracket is connected with the forward end of a rotary mower adjacent to cut grass exhaust port. The vertical shaft is driven by a belt from the drive shaft of the mower.

M. E. True U.S. Pat. No. 2,771,730 is directed to a lawn mower and trimmer having in combination a wheeled carriage under which a blade is rotatably mounted in grass cutting relationship having mounted laterally on the carriage a pivoted means which carries on a free end thereof a rotatable trimmer blade. The carriage is provided with common power means for rotating the blade.

As will be evident from the foregoing references, these prior art devices are very complex compared with that of the present invention and would be more expensive to manufacture and maintain. The device of this invention is less expensive to manufacture and requires considerably less maintenance in addition to being simpler to employ, especially with respect to the flail portion of this device.

BRIEF DESCRIPTION OF THE DRAWINGS

FIG. 1 of the drawings is an overall side view showing the combined power mower-flail assembly of this invention.

FIG. 2 in its upper and lower portions shows a section through the mower deck/flail housing along the lines 2—2 of FIG. 1.

FIG. 3 is a top plan view of the combined assembly of this invention. This top plan view is taken along the lines 3—3 of FIG. 1.

FIG. 4 is a partial sectional view of the power mower drive shaft including the main mower drive wheel and mower blade taken along the lines of 4—4 of FIG. 3.

FIG. 5 is a partial sectional view of the flail assembly engaged, viz., when it is ready to be driven by the flail drive pulley and when it is so driven.

FIG. 6 is a partial sectional view of the flail assembly disengaged, when it is not being driven by the flail drive pulley and when the flail cord-length is being adjusted.

FIG. 7 is an isometric view of the flail assembly including the main flail housing with its flail pivot bolt.

FIG. 8 is an isometric view of the opposite end of the flail main housing, viz., that portion thereof connected to the driven disk by the stub shaft.

DETAILED DESCRIPTION OF THE INVENTION

In accordance with FIG. 1, power mower-flail trimmer assembly 10 has a mower deck 11 and mower engine 12 mounted on the upper portion thereof. Hingedly connected to the mower deck 11 is flail safety cover and protective guard 13 via flail safety cover hinge 29. When it is desired to use the flail for side trimming, flail cable actuator 16 located on handle 17 is actuated which pulls cable 15 to cause the flail to operate in a direction opposite that of the rotation of the mower blade 25. The flail is contained on spool 28 (FIG. 2, lower portion) and is paid out to the desired length where it is shown at 14 and positioned by cord (flail) retaining notch 14'. The flail safety cover and protective guard 13 is positioned adjacent to the vertical portion 3 (lower blade safety cover of mower housing 11). Within flail safety cover and protective guard 13 is the flail assembly 31. In this illustration mower drive/blade control lever 18 is positioned on the opposite side of mower handle 17 from that on which the flail cable actuator 16 is located.

As will be observed from FIGS. 2 and 3, actuation of the flail cable actuator 16 (FIG. 1) causes driven disk 20 to come in contact with main mower drive wheel 19 thus rotating pulley 21 of the power take-off. Pulley belt 22 then rotates flail drive pulley 26. Flail drive pulley 26 is operatively connected to flail spool 28 causing rotation of the flail (nylon or other cord 14) to accomplish the desired trimming.

Flail main housing 24 has located on its distal side a flail main housing slotted extension arm 24''' with a slot 24' located therein. Located inwardly or medially of the slotted extension arm 24'' is flail main housing pivot bolt opening 24' in which is located flail pivot bolt 27 (FIG. 7) secured at its distal end via flail pivot nut 27' and intermediate flail pivot washer 27''.

Return spring and support 23 is attached at its upper end fixedly to the interior upper portion of mower deck 11 and at its lower end supports the bottom portion of flail main housing 24. The other distal end of flail main housing 24, viz., the flail main housing stub shaft extension arm 49 (opposite from slotted extension arm 24'') is fixedly secured to stub shaft 50. The upper portion of stub shaft 50 has a groove 51. Mounted on stub shaft 50 is first pulley 21 for the power take-off and then driven disk 20 which are centrally secured. Pins 52 pass through openings 52' on driven disk 20 and then openings 52'' on power take off pulley 21, respectively, to aid in securing said pulley and driven disk in position on stub shaft 50. The pulley—driven disc assembly is completed using stub shaft washer 53 and stub shaft retainer ring/clip 54 which fits into stub shaft groove 51. Operation of flail cable actuator 16 by the operator of the combined mower-flail trimmer causes flail cable 15 to retract rearwardly thereby causing the flail main housing 24 to pivot around flail pivot bolt 27. This action puts pressure on return spring and support 23 which causes it to move rearwardly in the same direction as the flail main housing 24. Continued retraction of engaging cable 15 causes the flail main housing 24 to move rearwardly against the pressure of return spring and support 23 until the driven disc 20 comes into contact with main mower drive wheel 19. This contact causes driven disc 20 and attached take off pulley 21 to rotate in a direction opposite to that of main mower drive wheel 19. This rotation is transferred via belt 22 to flail assembly 31 which causes the flail to rotate and commence its cutting action.

Releasing the pressure on engaging cable actuator 16 allows cable 15 to move forward thereby allowing the pressure of return spring and support 23 to move the flail main housing 24 forward and disengages driven disc 20 from main mower drive wheel 19. This disengagement removes the rotating force from belt 22 and flail assembly 31 which causes both of them to cease rotating.

Threaded mower blade attaching bolt 33' and washer(s) 32 fixedly secure mower blade 25 to its counterbored threaded drive shaft 33. Additional securing means in the form of bolts 34, intermediate common washer 36 and nuts 35 can also be employed as shown in FIG. 4, although they are neither required nor preffered.

FIGS. 5-7 illustrate in detail the positional relationship and assembly of the flail assembly 31 and its corresponding flail pivot bolt 27 (FIG. 7) with respect to slotted flail main housing arm 24" and flail main housing 24. As shown in FIGS. 5-7, flail assembly central driven shaft 37 is connected at its upper flat milled portion 38 to flail drive pulley 26 and at its lower threaded end to flail spool 28. The flat milled portion 38 of the central driven shaft 37 is inserted upwardly through locking nut 48, slot 24''', thin nut 47 and threaded adjuster housing bolt 46 with opening 46' and flail drive pulley central opening 26' of flail drive pulley 26. Finally flat milled portion 38 passes through flail drive pulley retaining washer 44 where flail drive pulley retainer ring/clip 45 is passed through groove 38' provided in the upper part of flat milled portion 38.

Adjustor housing bolt 46, thin nut 47 and locking nut 48 are used to adjust the tension of pulley belt 22. Thin nut 47 is screwed onto adjustor housing bolt 46 and fits loosely in slot 24'''. It keeps adjustor housing bolt 46 from turning when locking nut 48 is loosened or tightened.

To adjust the tension of pulley belt 22 turn mower engine OFF, loosen locking nut 48, slide adjustor housing bolt 46 and thin nut 47 back or forth in slot 24''' as desired. Then tighten locking nut 48.

Along the central portion of flail assembly central driven shaft 37 there is located a hexagonal key or locking portion 39. This locking portion 39 fits into a corresponding hexagonal shaped recess 40 in flail spool 28. The threaded bottom portion of flail assembly central driven shaft 37 is then passed through the flail assembly spring 41 and spring washer 42 where it is attached to flail assembly spring securing nut 43 to complete the assembly of the flail unit on the flail main housing 24. The mower blade 25 of the power mower—flail trimmer combined assembly 10 is operated by the main mower drive shaft 32. Main mower drive wheel 19 is also mounted on main mower drive shaft 32 above mower blade 25. Drive wheel 19 rotates at the same speed in the same direction as mower blade 25.

FLAIL LENGTH ADJUSTMENT

With the mower engine OFF lift flail safety cover and protective guard 13. Grasp flail drive pulley 26 and lift upwardly against the pressure of flail assembly spring 41. This frees hexagonal key 39 from hexagonal recess 40 in flail spool 28. Flail spool 28 is now freewheeling. Remove flail cord 14 from cord retaining notch 14' and pull the cord to its desired length. Then reinstall flail cord 14 into retaining notch 14'. Release the upward pressure on drive pulley 26 and let hexagonal key 39 reseat in hexagonal recess 40. Finally lower protective guard 13. The adjustment of the flail cord length is then completed.

I claim:

1. A combined mower blade flail assembly comprising a mower blade capable of rotating in one direction within a mower deck having an upper interior portion and end portions, a flail assembly capable of flail cord rotation only in a direction opposite from and at a speed faster than that of said mower blade, a drive shaft for said mower blade connected to a drive wheel, a separate drive shaft for said flail assembly capable of independent operative connection to a separate drive disc, and means to operatively connect said mower blade drive wheel to said flail assembly drive disc to cause simultaneous rotation of said flail assembly drive disc with said mower blade drive wheel but in a direction opposite from and at a speed greater than said mower blade drive wheel.

2. A combined mower blade flail assembly as in claim 1 wherein said flail assembly has a safety cover and protective guard hingedly connected to said mower deck.

3. A combined mower blade flail assembly as in claim 1 which includes an operating handle with cable and pulley means to cause the flail assembly drive disc to operate simultaneously with said mower blade drive wheel.

4. A combined mower blade flail assembly as in claim 3 wherein said flail assembly includes a flail main housing supported and positioned whereby upon engagement of said operating handle, said cable pulls said flail main housing rearwardly permitting said flail assembly drive disc to come in contact with said mower blade drive wheel thereby causing rotation of said pulley mean resulting in simultaneous operation of said flail assembly drive disc with said mower blade drive wheel.

5. A combined mower blade flail assembly as in claim 4 which includes a return spring and support means having an upper flange portion and a bottom end, which supports said flail main housing and keeps said flail assembly drive disc away from said mower blade drive wheel until said operating handle is engaged.

6. A combined mower blade flail assembly as in claim 5 wherein said flail main housing of said flail assembly includes an extension arm with a stub shaft at one end thereof and wherein said upper flange portion of said return spring and support means is attached to the upper interior portion of said mower deck adjacent one end portion thereof and the bottom end of said return spring and support means supports the bottom portion of said flail main housing at a position near said flail main housing stub shaft extension arm.

7. A combined mower blade flail assembly as in claim 5 wherein said flail main housing of said flail assembly includes an extension arm having a slot at the other end thereof.

8. A combined mower blade flail assembly as in claim 1 wherein said flail assembly includes a spool 9. A combined mower blade flail assembly as in claim 1 wherein said mower blade drive shaft is counterbored and threaded and said mower blade is fixedly secured to said mower blade drive shaft with a threaded bolt and washer(s).

10. A combined mower blade flail assembly as in claim 8 wherein said spool includes a hexagonal shaped recess.

* * * * *